C. WIRT.
ELECTRICAL INDICATOR.
APPLICATION FILED APR. 24, 1907.

952,163.

Patented Mar. 15, 1910.
2 SHEETS—SHEET 1.

WITNESSES:
Jas. F. Coleman
John Tokich

INVENTOR
Charles Wirt
BY Dyer & Dyer
ATTORNEY.

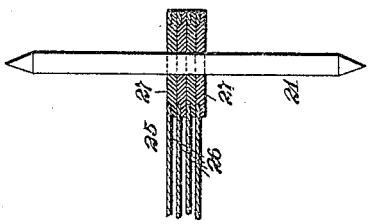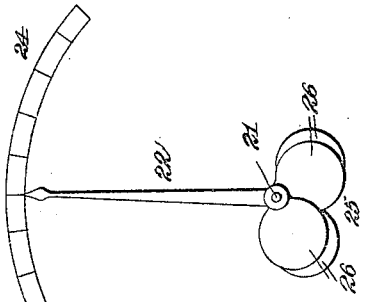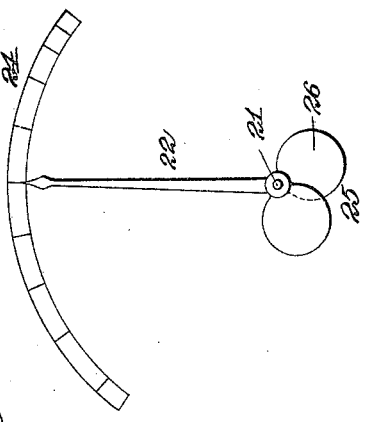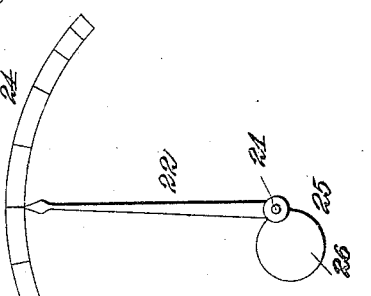

UNITED STATES PATENT OFFICE.

CHARLES WIRT, OF PHILADELPHIA, PENNSYLVANIA, ASSIGNOR TO CHARLES WIRT AND COMPANY, OF NEWARK, NEW JERSEY, A CORPORATION OF NEW JERSEY.

ELECTRICAL INDICATOR.

952,163.  Specification of Letters Patent.  Patented Mar. 15, 1910.

Application filed April 24, 1907. Serial No. 369,889.

*To all whom it may concern:*

Be it known that I, CHARLES WIRT, a citizen of the United States, residing in the city of Philadelphia, county of Philadelphia, State of Pennsylvania, have invented a certain new and useful Improvement in Electrical Indicators, of which the following is a specification.

The object I have in view is the production of an electrical indicator such as an ammeter or voltmeter employing a soft iron armature, which instrument will be cheap in construction, accurate in operation, and will be provided with a scale more equally divided than heretofore in instruments of this class.

Figure 1:
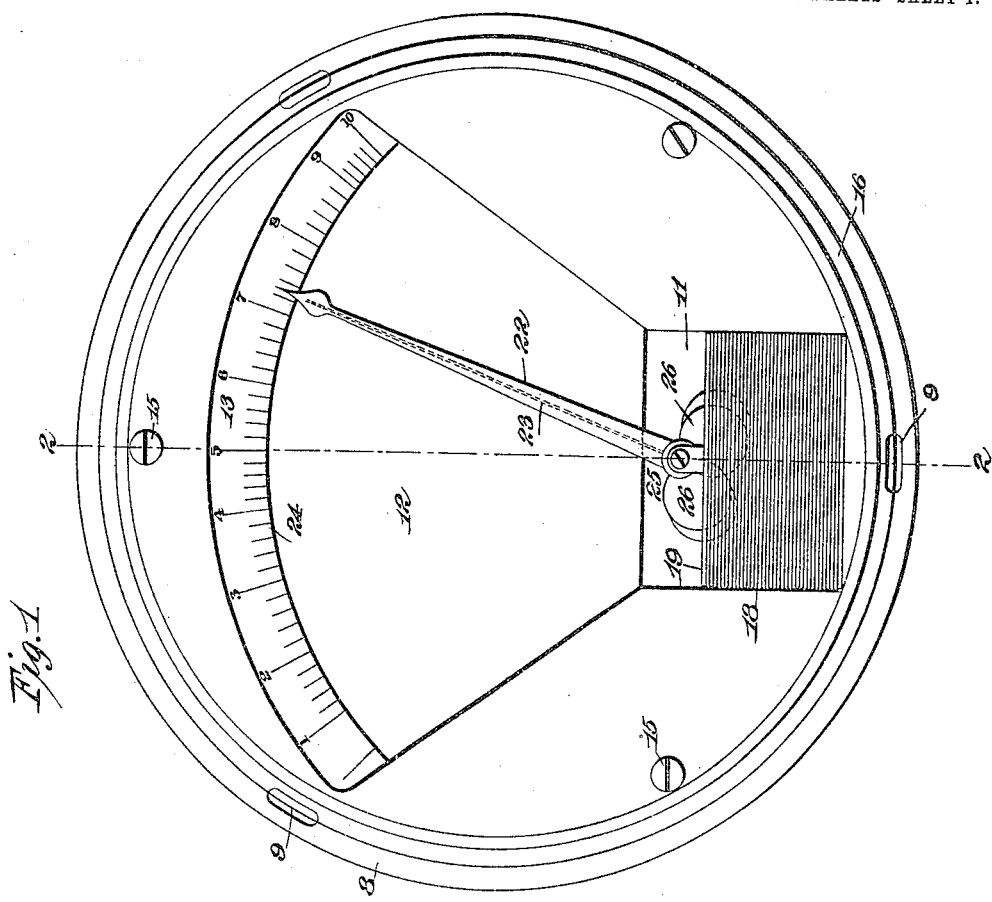
Figure 2:
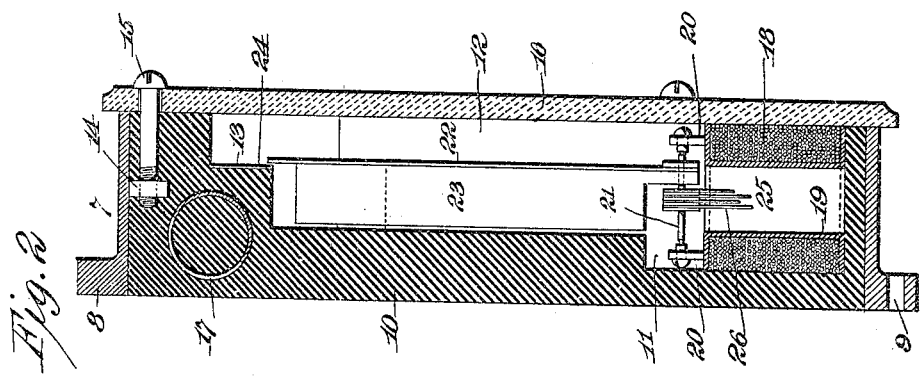

In the accompanying drawing, Figure 1 is an elevation of an indicator embodying my invention; Fig. 2 is a vertical section of the same on line 2—2 in Fig. 1; Figs. 3, 4 and 5 are views indicating the effect upon the divisions of the scale of the peculiar soft iron armature which constitutes one of the features of my invention; and Fig. 6 is a sectional view on an enlarged scale showing the method of constructing the armature.

The instrument is inclosed in a cast iron ring 7 having an outwardly turned flange 8 provided with slotted openings 9 by which the instrument is secured to a switchboard or other upright support, since the instrument is designed to operate against gravity and must therefore be given an upright position.

The supporting body of the instrument is composed of a body 10 of molded plastic insulating material. This may be, for example, Portland cement or sand-lime or other artificial stone composition, which is molded in the containing ring 7 under pressure in a suitable mold. On the rear side of the instrument the molded body 10 is flush with the edge of the ring 7. On the front side of the instrument the body 10 is molded with a rectangular recess 11 at the bottom of the instrument for receiving the field coil of the instrument and its armature supports, and with a segmental recess 12 in which the indicating pointer and its damping vane swing, such recess 12 extending from the recess 11 toward the top of the instrument and being provided with a shelf 13 for receiving the scale. Nuts 14 are molded in the body of insulating material for receiving screws 15 by means of which the cover 16 is screwed to the instrument. This cover is preferably of glass. In the case of a voltmeter a resistance unit 17 is molded in the body 10 of plastic insulating material.

The field coil 18 of the instrument is a coil wound upon a rectangular brass spool 19 which is placed in the recess 11 in the plastic body 10, making a close fit therein, and is held in such recess by the clamping of the cover 16 directly upon the field coil. Lugs 20 projecting from the spool 19 support a shaft 21, which shaft carries a pointer 22 preferably provided with a damping vane 23 on its rear side. This pointer projects from the shaft 21 over the scale 24 which is secured to the shelf 13.

The armature 25 of the instrument is made up of a plurality (preferably four or more) of overlapping thin soft iron plates 26, which are secured to the shaft 21 by means of hubs 27 of brass or other non-magnetic material, so that such plates 26 are separated from each other and from the shaft by non-magnetic material, as shown in Fig. 6. These plates 26 project from the shaft 21 in parallel planes into the interior of the coil 18 and are within the influence of the magnetic field of the coil. The thin soft iron plates 26 may be of any convenient shape, but are preferably in the form of disks extended on one side to embrace the shaft 21.

I have found that by the employment of a plurality of these overlapping parallel thin plates or disks of soft iron placed close together and separated magnetically from each other and from the shaft, and by the adjustment of the disks to different angular positions determined by trial, the effect of the field upon the armature as a whole can be made such that the indicating finger or pointer will be given approximately equal increments of movement for equal increments of current in the coil, thus producing a scale more uniformly divided than heretofore in instruments of this character having soft iron armatures.

In Figs. 3, 4 and 5 are illustrated scales which are the result of the best adjustment of one, two and four disks respectively. It will be noticed that with one disk (Fig. 3) the end divisions of the scale are very much shorter than the central divisions; with two disks (Fig. 4) the divisions at one end of the scale are lengthened out to approximate those at the center of the scale, but the divisions at the other end of the scale are still short; with four disks adjusted to give the best results (Fig. 5) the divisions at both ends of the scale approximate in length those at the center of the scale. With a still larger number of disks it is probable that an adjustment could be secured which would give practically equal divisions throughout the length of the scale, but the approximation to equality produced by four disks is sufficiently close for practical purposes. In Fig. 1 the scale illustrated is that actually employed in instruments constructed by me having four disks adjusted to the relative angular positions shown in that figure. When the adjustment of the disks is once determined in a trial instrument, the disks will be given their proper angular relation in subsequent instruments without adjustment, the disks and their supporting hubs being permanently secured together and upon the shaft.

The employment of a body of molded plastic insulation forming a one-piece support and insulation for the several parts of the instrument, not only makes the instrument extremely cheap to construct, but also adds to its accuracy in use, because the large body of insulating material employed tends to prevent the excessive heating of the coils—both the field coil and the resistance coil—and serves to equalize the temperature or make it more uniform by reason of the presence in direct contact with the coils of a large mass of material. The clamping of the cover directly upon the field coil also helps to dissipate the heat.

What I claim is:

1. In an electrical indicator, the combination with the field coil, of a soft iron armature consisting of a plurality of overlapping thin soft iron plates mounted in different angular positions and in parallel planes upon a common pivot and adjustable angularly in constant parallelism so as to produce approximately equal increments of movement for equal increments of current, substantially as set forth.

2. In an electrical indicator, the combination with the field coil, of a soft iron armature consisting of a plurality of overlapping thin soft iron plates placed close together on a common pivot but separated magnetically from each other and the pivot and mounted in different angular positions and in parallel planes upon a common pivot, substantially as set forth.

3. In an electrical indicator, the combination with the field coil, of a soft iron armature consisting of a plurality of overlapping thin soft iron plates secured at one edge to a common pivot and projecting therefrom in different angular directions but in parallel planes and adjustable angularly in constant parallelism, such plates being placed close together and separated magnetically from each other and from the common pivot, substantially as set forth.

4. In an electrical indicator, the combination with the field coil, of a soft iron armature consisting of a plurality of overlapping thin soft iron plates located in parallel planes, an armature shaft and hubs of non-magnetic material mounted upon said shaft carrying said soft iron plates and separating said plates magnetically both from the shaft and from each other, substantially as set forth.

5. In an electrical indicator, the combination with the field coil, armature and pointer, of a body of molded plastic insulating material having molded in its face a recess to receive the field coil and a segmental recess in which the pointer plays, substantially as set forth.

6. In an electrical indicator, the combination with the field coil, armature and pointer, of the molded body of plastic insulating material supporting the electrical elements of the instrument and having a recess in its face for receiving the field coil, and the glass cover clamped directly upon the field coil and holding it in position in said recess, substantially as set forth.

7. In an electrical indicator, the combination with the field coil, armature and pointer, of a molded body of plastic insulating material having recesses to receive the coil and permit the play of the pointer, a surrounding metal ring in which the body of insulation is molded, and a glass cover clamped directly upon the field coil and holding it in position in the insulating body, substantially as set forth.

This specification signed and witnessed this 27th day of March, 1907.

CHARLES WIRT.

Witnesses:
  JOHN L. LOTSCH,
  J. F. COLEMAN.